(12) United States Patent
Guo et al.

(10) Patent No.: US 12,027,860 B2
(45) Date of Patent: Jul. 2, 2024

(54) SOURCE-NETWORK-LOAD-STORAGE COORDINATION DISPATCHING METHOD IN BACKGROUND OF COUPLING OF RENEWABLE ENERGY SOURCES

(71) Applicant: STATE GRID ZHEJIANG ELECTRIC POWER CO., LTD. TAIZHOU POWER SUPPLY COMPANY, Zhejiang (CN)

(72) Inventors: Feng Guo, Zhejiang (CN); Jian Yang, Zhejiang (CN); Lintong Wang, Zhejiang (CN); Jiahao Zhou, Zhejiang (CN); Yefeng Luo, Zhejiang (CN); Dongbo Zhang, Zhejiang (CN); Yuande Zheng, Zhejiang (CN); Guode Ying, Zhejiang (CN); Minzhi Chen, Zhejiang (CN); Xinjian Chen, Zhejiang (CN); Jie Yu, Zhejiang (CN); Weiming Lu, Zhejiang (CN); Chi Zhang, Zhejiang (CN); Yizhi Zhu, Zhejiang (CN); Binren Wang, Zhejiang (CN); Chenghuai Hong, Zhejiang (CN)

(73) Assignee: STATE GRID ZHEJIANG ELECTRIC POWER CO., LTD. TAIZHOU POWER SUPPLY COMPANY, Taizhou (CN)

(*) Notice: Subject to any disclaimer, the term of this patent is extended or adjusted under 35 U.S.C. 154(b) by 0 days.

(21) Appl. No.: 17/767,447

(22) PCT Filed: Jan. 14, 2022

(86) PCT No.: PCT/CN2022/072063
§ 371 (c)(1),
(2) Date: Apr. 8, 2022

(87) PCT Pub. No.: WO2023/065552
PCT Pub. Date: Apr. 27, 2023

(65) Prior Publication Data
US 2024/0097443 A1 Mar. 21, 2024

(30) Foreign Application Priority Data
Oct. 21, 2021 (CN) .......................... 202111228442.8

(51) Int. Cl.
*H02J 3/00* (2006.01)
*H02J 3/46* (2006.01)

(52) U.S. Cl.
CPC ................ *H02J 3/004* (2020.01); *H02J 3/46* (2013.01); *H02J 2203/20* (2020.01)

(58) Field of Classification Search
CPC .......... H02J 3/004; H02J 3/46; H02J 2203/20; H02J 3/003; H02J 3/32; H02J 3/38;
(Continued)

(56) References Cited

U.S. PATENT DOCUMENTS 8,626,353 B2 * 1/2014 Ghosh .................... G06Q 50/06
700/32
9,932,907 B2 * 4/2018 Tiwari ....................... F02C 9/42
(Continued)

*Primary Examiner* — Ramesh B Patel

(57) ABSTRACT

A source-network-load-storage coordination dispatching method in a background of a coupling of renewable energy sources, including: taking an expectation of a minimum grid operating cost in a dispatching cycle as an objective function; generating an approximate value function of an output of a set for generating electricity from renewable energy sources and a user load, and constructing a source-network-load-storage coordination dispatching model with combination of the objective function; obtaining forecast data of the output of a set for generating electricity from renewable energy sources and the user load, and inputting the forecast data into the dispatching model for solving; performing iterative updating on the approximate value function, importing the approximate value function after the iterative
(Continued)

updating into the dispatching model for iterative solving, and terminating an iterative process until a solving result satisfies a preset convergence condition; and using a solving result of a last iteration as a dispatching strategy.

8 Claims, 1 Drawing Sheet

(58) Field of Classification Search
CPC ...... H02J 3/381; H02J 3/14; H02J 3/28; H02J 2203/10; H02J 2300/10; H02J 2300/24; H02J 2300/28; Y02B 70/3225; Y02E 10/56; Y04S 20/222
See application file for complete search history.

(56) References Cited

U.S. PATENT DOCUMENTS

| | | | | |
|---|---|---|---|---|
| 9,945,264 | B2 * | 4/2018 | Wichmann | G05F 1/66 |
| 9,957,843 | B2 * | 5/2018 | Wichmann | F01K 13/02 |
| 10,418,822 | B2 * | 9/2019 | Sun | G06Q 10/063 |
| 10,534,328 | B2 * | 1/2020 | Ganti | G06Q 10/20 |
| 2010/0179704 | A1 * | 7/2010 | Ozog | H02J 7/35 |
| | | | | 703/2 |
| 2011/0231028 | A1 * | 9/2011 | Ozog | H02J 3/14 |
| | | | | 700/291 |
| 2014/0074311 | A1 * | 3/2014 | Kearns | H02J 3/38 |
| | | | | 700/297 |
| 2020/0176995 | A1 * | 6/2020 | Fu | H02H 3/003 |
| 2020/0313433 | A1 * | 10/2020 | Chen | H02J 3/381 |
| 2021/0057909 | A1 * | 2/2021 | Miller | H02J 3/008 |
| 2021/0376614 | A1 * | 12/2021 | Yang | G05B 13/048 |
| 2021/0408781 | A1 * | 12/2021 | Zhao | H02J 3/381 |
| 2023/0243883 | A1 * | 8/2023 | Si | G01R 31/003 |
| | | | | 324/500 |
| 2023/0378754 | A1 * | 11/2023 | Buttgenbach | G05B 19/042 |
| 2024/0088667 | A1 * | 3/2024 | Yang | H02J 3/32 |
| 2024/0118702 | A1 * | 4/2024 | Cella | G06N 20/00 |

* cited by examiner

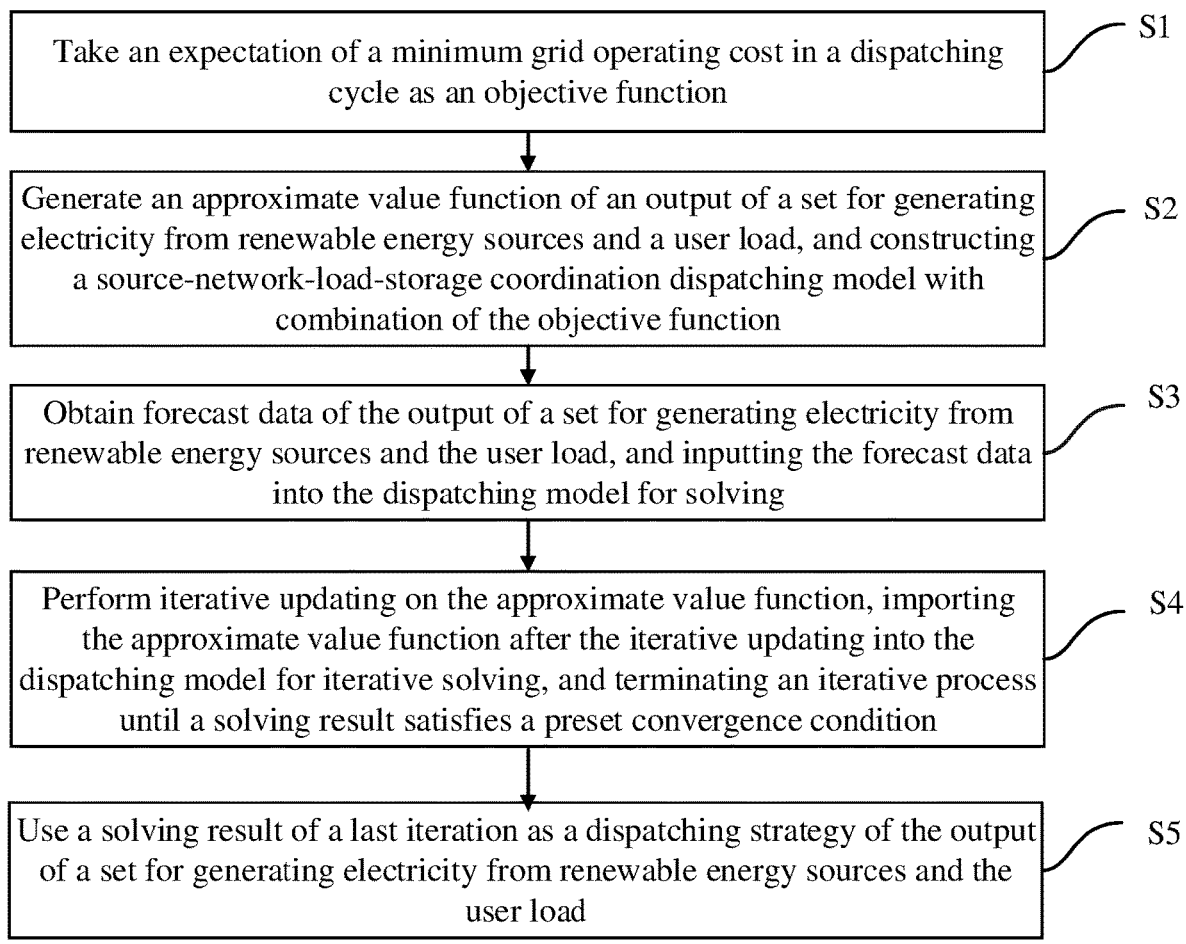

SOURCE-NETWORK-LOAD-STORAGE COORDINATION DISPATCHING METHOD IN BACKGROUND OF COUPLING OF RENEWABLE ENERGY SOURCES

FIELD OF THE TECHNOLOGY

This application relates to the field of electric power system dispatching technologies, and specifically to a source-network-load-storage coordination dispatching method in a background of a coupling of renewable energy sources.

BACKGROUND OF THE DISCLOSURE

In a new type of electric power system with a renewable energy source as the main body, a new type of energy storage system represented by a hydrogen storage system allows for a wide application, which greatly improves a level of a renewable energy source interconnection and consumption. In addition, the new type of energy storage system shows source-network-load-storage coordination characteristics, which improves dynamic balance ability of the electric power system more economically, efficiently and safely, thereby maximizing utilization of energy resources. However, uncertain factors that need to be considered to maintain the electric power system stability and the economic operation also increase, which affects accuracy of a dispatching strategy.

SUMMARY

In order to solve shortcomings and deficiencies in the related art, the present disclosure provides a source-network-load-storage coordination dispatching method in a background of a coupling of renewable energy sources, including:
  taking an expectation of a minimum grid operating cost in a dispatching cycle as an objective function;
  generating an approximate value function of an output of a set for generating electricity from renewable energy sources and a user load, and constructing a source-network-load-storage coordination dispatching model with combination of the objective function;
  obtaining forecast data of the output of a set for generating electricity from renewable energy sources and the user load, and inputting the forecast data into the dispatching model for solving;
  performing iterative updating on the approximate value function, importing the approximate value function after the iterative updating into the dispatching model for iterative solving, and terminating an iterative process until a solving result satisfies a preset convergence condition; and
  using a solving result of a last iteration as a dispatching strategy of the output of a set for generating electricity from renewable energy sources and the user load.

Optionally, the set for generating electricity from renewable energy sources includes a wind turbine generator set, a photovoltaic generator set, and a hydrogen energy storage system, and the taking an expectation of a minimum grid operating cost in a dispatching cycle as an objective function includes:
  dividing the dispatching cycle into T time periods, and constructing a grid operating cost function as:

$$\min \sum_{t=1}^{T}(C_{f,t} + C_{m,t} + C_{p,t} + C_{cur,t})$$

$$C_{f,t} = k_{DG} \cdot P_{DG,t} \cdot \Delta t$$

$$C_{m,t} = \left[ l_{DG} \cdot P_{DG,t} + l_{WT} \cdot P_{WT,t} + l_{PV} \cdot P_{PV,t} + l_{HS} \cdot \left( P_{HS,t}^c + P_{HS,t}^d \right) \right] \cdot \Delta t$$

$$C_{p,t} = p_t \cdot P_{grid,t} \cdot \Delta t$$

$$C_{cur,t} = \left[ c^{wt} \cdot \left( P_{WT,t}^{\alpha} - P_{WT,t} \right) + c^{pv} \cdot \left( P_{PV,t}^{\alpha} - P_{PV,t} \right) + c^{load} \cdot P_{load,t}^{cur} \right] \cdot \Delta t$$

$C_{f,t}$ represents a fuel cost of a diesel generator set in a time period t; $C_{m,t}$ represents an operation and maintenance cost of the diesel generator set, a wind turbine generator set, a photovoltaic generator set, and a hydrogen energy storage system in the time period t; $C_{p,t}$ represents a cost of purchasing and selling electricity through a submarine cable in the time period t; $C_{cur,t}$ represents a cost of a wind curtailment, a photovoltaic (PV) curtailment, and a load curtailment in the time period t; $k_{DG}$ represents a fuel cost of the diesel generator set per unit active power generation; $I_{DG,t}$ represents an active power of the diesel generator set in the time period t; $I_{DG}$ represents an operation and maintenance cost of the diesel generator set; $I_{WT}$ represents an operation and maintenance cost of the wind turbine generator set per unit active power generation; $I_{PV}$ represents an operation and maintenance cost of the photovoltaic generator set per unit active power generation; $I_{HS}$ represents an operation and maintenance cost of the hydrogen energy storage system per unit active power generation; $P_{WT,t}$ represents an active power generation of the wind turbine generator set in the time period t according to the dispatching strategy; $P_{PV,t}$ represents an active power generation of the photovoltaic generator set in the time period t according to the dispatching strategy; $P_{HS,t}^c$ represents a charging power of the hydrogen energy storage system in the time period t according to the dispatching strategy; $P_{HS,t}^d$ represents a discharging power of the hydrogen energy storage system in the time period t according to the dispatching strategy; $p_t$ represents a price of electricity purchased and sold through a tie line; $P_{grid,t}$ represents an amount of electricity purchased and sold through the tie line; $c^{wt}$ represents a cost of the wind curtailment per unit electricity; $c^{pv}$ represents a cost of the PV curtailment per unit electricity; $c^{load}$ represents a cost of the load curtailment per unit electricity; $P_{WT,t}^{\alpha}$ represents an available output of the wind turbine generator set in the time period t; $P_{PV,t}^{\alpha}$ represents an available output of the photovoltaic generator set in the time period t; $P_{load,t}^{cur}$ represents the load curtailment in the time period t; $\Delta t$ represents a duration of the time period t; and constraints imposed on the grid operating cost function comprises:

$$\begin{cases} P_{DG,t} + P_{WT,t} + P_{PV,t} + P_{HS,t}^c + P_{HS,t}^d + P_{grid,t} = D_t \\ HS_t = HS_{t-1} + \left( \eta^c P_{HS,t}^c - \frac{P_{HS,t}^d}{\eta^d} \right) \Delta t \\ 0 \le P_{load,t}^{cur} \le D_t \end{cases}$$

$HS_t$ represents a hydrogen storage amount in the time period t; $HS_{t-1}$ represents a hydrogen storage amount in a time period t−1; $\eta^c$ represents a hydrogen production efficiency; $\eta^d$ represents a discharging efficiency of a hydrogen fuel cell; and D t represents the user load in the time period t; and taking an expectation of the grid operating cost function in the dispatching cycle as the objective function.

Optionally, in a case that $P_{grid,t}$ has a positive value, it indicates that a grid purchases electricity through the tie line in the time period t; and in a case that $P_{grid,t}$ has a negative value, it indicates that the grid sells electricity through the tie line in the time period t.

Optionally, the generating an approximate value function of an output of a set for generating electricity from renewable energy sources and a user load, and constructing a source-network-load-storage coordination dispatching model with combination of the objective function includes:

dividing the objective function as:

$$\min\{C_t(S_{k,t},x_{k,t}) + \gamma E[V_{t+1}(S_{k,t+1})|(S_{k,t},x_{k,t})]\}$$

$x_{k,t}$ is a decision variable at a kth iteration, comprising an active power of a diesel generator set, an active power generation of a wind turbine generator set, an active power generation of a photovoltaic generator set, charging and discharging powers of a hydrogen energy storage system, and a load curtailment; $S_{k,t}$ is a pre-state variable before executing the decision variable at the kth iteration, comprising an available output of the photovoltaic generator set, an available output of the wind turbine generator set, a hydrogen storage amount, a limit value of the user load, a price of electricity purchased and sold through a tie line in the time period t, and an active power of the diesel generator set in a time period t−1; $C_t(S_{k,t}, x_{k,t})$ is a determined factor, representing a grid operating cost before executing the decision variable in a case of the pre-state variable $S_{k,t}$ in the time period t at the kth iteration; $E[V_{t+1}(S_{k,t+1})|(S_{k,t}, x_{k,t})]$ is an expectation factor, representing an expectation of $V_{t+1}(S_{k,t+1})$ in a case of the pre-state variable $S_{k,t}$ and the decision variable $x_{k,t}$; $V_{t+1}(S_{k,t+1})$ represents a value function of $S_{k,t+1}$, representing the grid operating cost obtained by executing different decision variables in a case of the pre-state variable $S_{k,t+1}$ from a time period t+1; and γ represents a preset discount factor; and executing the decision variable $x_{k,t}$ in the time period t, to generate the approximate value function $\overline{V}_t^x(S_{k,t}^x)$ of the state variable $S_{k,t}$ after the execution, and replacing the expectation factor of the objective function with the approximate value function $\overline{V}_t^x(S_{k,t}^x)$, to obtain the dispatching model as:

$$\min\{C_t(S_{k,t},x_{k,t}) + \gamma \overline{V}_t^x(S_{k,t}^x)\}.$$

Optionally, the performing iterative updating on the approximate value function, importing the approximate value function after the iterative updating into the dispatching model for iterative solving includes:

adding a real-time grid cost and the approximate value function of a previous iteration as an observation cost, the observation cost at a kth iteration being expressed as:

$$F_{k,S}(S_{k,t},x_{k,t}) = C_t(S_{k,t},x_{k,t}) + \overline{V}_t^x(S_{k-1,t}^x)$$

$C_t(S_{k,t}, x_{k,t})$ represents a grid operating cost before executing a decision variable in a case of a pre-state variable $S_{k,t}$ in a time period t at the kth iteration; and $\overline{V}_t^x(S_{k-1,t}^x)$ represents the approximate value function of a state variable $S_{k-1,t}^x$ after executing a decision variable $x_{k-1,t}$ in the time period t at a (k−1)th iteration;

performing the iterative updating on the approximation value function $\overline{V}_t^x(S_{k,t}^x)$ at the kth iteration as:

$$\overline{V}_t^x(S_{k,t}^x) = (1-\alpha)\overline{V}_{k-1,t-1}^x(S_{k-1,t-1}^x) + \alpha F_{k,S}(S_{k,t},x_{k,t})$$

α is a preset smooth step, α∈[0,1]; and $\overline{V}_{k-1,t-1}^x(S_{k-1,t-1}^x)$ represents the approximate value function of the state variable $S_{k-1,t-1}^x$ after executing the decision variable in a time period t−1 at the (k−1)th iteration; and substituting $\overline{V}_t^x(S_{k,t}^x)$ into the dispatching model, and solving the decision variable $x_{k,t}$ in the dispatching model.

Optionally, an initial value of the approximate value function is 0.

Optionally, the terminating an iterative process until a solving result satisfies a preset convergence condition includes:

terminating the iterative process in a case that a difference between two adjacent solving results is less than a preset threshold, the solving results comprising the decision variable and the state variable at the last iteration.

Optionally, the obtaining forecast data of the output of a set for generating electricity from renewable energy sources and the user load includes:

obtaining historical data of the output of a set for generating electricity from renewable energy sources and the user load respectively, performing nonlinear fitting on the historical data to obtain a fitting result, and obtaining the forecast data of the output of a set for generating electricity from renewable energy sources and the user load in the dispatching cycle according to the fitting result.

The present disclosure has at least the following beneficial effects.

The present disclosure, by using the approximate dynamic programming technique, performs approximate dynamic programming for different time periods on an expectation of the dispatching based on the value function, which omits calculation of an expected value in an existing dispatching model, thereby reducing influences of uncertainties of the renewable energy sources and the user load in the source-network-load-storage coordination dispatching model on the dispatching strategy. In addition, the function value approaches the expected value in a convergent manner through iteration, which lessens computational complexity of the dispatching strategy. This can effectively reduce influences of uncertain factors on the electric power system stability and the economic operation, so as to realize efficient and stable energy supply in the case of source-load fluctuations, thereby improving energy efficiency.

BRIEF DESCRIPTION OF THE DRAWINGS

In order to clear describe the technical solutions of the present disclosure, the following briefly introduces accompanying drawings used in the description of the embodiments. The accompanying drawings in the following are merely some embodiments of the present disclosure. The person skilled in the art may obtain other drawings according to these drawings without any creative effort.

FIG. 1 is a schematic flowchart of a source-network-load-storage coordination dispatching method in a background of a coupling of renewable energy sources according to an embodiment of the present disclosure.

DESCRIPTION OF EMBODIMENTS

To make the objectives, technical solutions, and advantages of the embodiments of the present disclosure clearer, the technical solutions according to the embodiments of the present disclosure are described below with reference to the accompanying drawing. The described embodiments are merely some rather than all of the embodiments of the present disclosure. Based on the embodiments of the present disclosure, all other embodiments obtained by those of ordinary skill in the art without creative efforts shall fall within the protection scope of the present disclosure.

Terms "first", "second", "third", "fourth", etc. (if present) in the description and claims of the present disclosure and the drawing are used to distinguish similar objects and are not intended to describe a specific order or sequence. The objects used in such a manner may be exchanged under a proper condition, so that the described embodiments of the present disclosure may be implemented in other sequences apart from those illustrated or described herein.

In various embodiments of the present disclosure, sequence numbers of processes do not mean an execution order. The execution order of the processes should be determined by their functionalities and internal logic, and should not constitute any limitation on the implementation process of the embodiments of the present disclosure.

In the present disclosure, "including", "comprising", and "having" and any variations thereof are intended to cover non-exclusive inclusion. For example, a process, a method, a system, a product or a device including a series of steps or units is not necessarily limited to steps or units that are expressly listed, but may instead include other steps or units that are not expressly listed or are inherent to the process, the method, the product or the device.

In the present invention, "plurality" refers to two or more; "and/or" is only association relationships that describes associated objects, indicating that there may exist three kinds of relationships. For example, "and/or B" means three conditions, including that A exists alone, A and B exist at the same time, and B exists alone. A character "I" generally indicates that the associated objects are in an "or" relationship; "including A, B and C" or "including A, B, C" means including all of A, B, and C; "contains A, B or C" means including one of A, B, and C, and "including A, B and/or C" means including any one or any two or three of A, B, and C.

In the present disclosure, "B corresponding to A", "A corresponds to B", or "B corresponds to A" means that B is associated with A, and B may be determined according to A. The determining B according to A does not mean that B is determined based only on A, but may also be determined based on A and/or other information. Matching between A and B means that a similarity between A and B is greater than or equal to a preset threshold.

Depending on the context, "if" as used herein may be interpreted as "in a case that" or "when" or "in response to determining" or "in response to detecting".

In the following, the technical solution of the present disclosure is described in detail with reference to specific embodiments. The following specific embodiments may be combined with each other. In addition, the same or similar concepts or processes may not be repeatedly described in some embodiments.

As shown in FIG. 1, an embodiment provides a source-network-load-storage coordination dispatching method in a background of a coupling of renewable energy sources, including:

S1. Take an expectation of a grid minimum operating cost in a dispatching cycle as an objective function.

S2. Generate an approximate value function of an output of a set for generating electricity from renewable energy sources and a user load, and construct a source-network-load-storage coordination dispatching model with combination of the objective function.

S3. Obtain forecast data of the output of a set for generating electricity from renewable energy sources and the user load, and input the forecast data into the dispatching model for solving.

S4. Perform iterative updating on the approximate value function, import the approximate value function after the iterative updating into the dispatching model for iterative solving, and terminate an iterative process until a solving result satisfies a preset convergence condition.

S5. Use a solving result of a last iteration as a dispatching strategy of the output of a set for generating electricity from renewable energy sources and the user load.

In the new type of electric power system with renewable energy sources as the main body, the renewable energy sources represented by wind power, photovoltaic and hydrogen storage allow for a wide application, which greatly improves a level of renewable energy source interconnection and consumption. In addition, the renewable energy sources show source-network-load-storage coordination characteristics, which improves dynamic balance ability of the electric power system more economically, efficiently and safely, thereby maximizing utilization of energy resources. However, due to limitations of the renewable energy sources, uncertain factors that need to be considered to maintain the electric power system stability and the economic operation also increase, which leads to a situation of "dimension explosion" more likely to occur during the process of solving an optimal dispatching problem. This embodiment performs approximate dynamic programming for different time periods on an expectation of the dispatching based on the value function, which realizes approximate estimation of the expectation, thereby alleviating computational burden. In addition to avoiding the "dimension disaster" problem, this embodiment can effectively reduce influences of uncertain factors on the electric power system stability and the economic operation, so as to realize efficient and stable energy supply in the case of source-load fluctuations, thereby improving energy efficiency.

First, in this embodiment, the set for generating electricity from renewable energy sources includes a wind turbine generator set, a photovoltaic generator set, and a hydrogen energy storage system, under the premise of ensuring reliable operation of a grid and maximum utilization of renewable energy, the minimum grid operating cost in the entire dispatching cycle is taken as the objective function. The objective function is a deterministic model. In the deterministic model, a wind power generation output, a photovoltaic output, and a load are assumed to be deterministic values. The dispatching cycle is divided into T time periods, with a time interval being Dt, e.g., Dt=1 h. If the dispatching cycle is 1 day, 24 time periods are divided. The objective function is expressed as follows:

$$\min \sum_{t=1}^{T} (C_{f,t} + C_{m,t} + C_{p,t} + C_{cur,t})$$

$$C_{f,t} = k_{DG} \cdot P_{DG,t} \cdot \Delta t$$

$$C_{m,t} = \left[ l_{DG} \cdot P_{DG,t} + l_{WT} \cdot P_{WT,t} + l_{PV} \cdot P_{PV,t} + l_{HS} \cdot \left( P_{HS,t}^c + P_{HS,t}^d \right) \right] \cdot \Delta t$$

$$C_{p,t} = p_t \cdot P_{grid,t} \cdot \Delta t$$

$$C_{cur,t} = \left[ c^{wt} \cdot \left( P_{WT,t}^a - P_{WT,t} \right) + c^{pv} \cdot \left( P_{PV,t}^a - P_{PV,t} \right) + c^{load} \cdot P_{load,t}^{cur} \right] \cdot \Delta t$$

Where, $C_{f,t}$ represents a fuel cost of a diesel generator set in a time period t; $C_{m,t}$ represents an operation and maintenance cost of the diesel generator set, a wind turbine generator set, a photovoltaic generator set, and a hydrogen energy storage system in the time period t; $C_{p,t}$ represents a cost of purchasing and selling electricity through a submarine cable in the time period t; $C_{cur,t}$ represents a cost of a wind curtailment, a PV curtailment, and a load curtailment in the time period t; $k_{DG}$ represents a fuel cost of the diesel generator set per unit active power generation; $P_{DG,t}$ represents an active power of the diesel generator set in the time period t; $I_{DG}$ represents an operation and maintenance cost of the diesel generator set; $I_{WT}$ represents an operation and maintenance cost of the wind turbine generator set per unit active power generation; $I_{PV}$ represents an operation and maintenance cost of the photovoltaic generator set per unit active power generation; $I_{HS}$ represents an operation and maintenance cost of the hydrogen energy storage system per unit active power generation; $P_{WT,t}$ represents an active power generation of the wind turbine generator set in the time period t according to the dispatching strategy; $P_{PV,t}$ represents an active power generation of the photovoltaic generator set in the time period t according to the dispatching strategy; $P_{HS,t}^{c}$ represents a charging power of the hydrogen energy storage system in the time period t according to the dispatching strategy; $P_{HS,t}^{d}$ represents a discharging power of the hydrogen energy storage system in the time period t according to the dispatching strategy; P t represents a price of electricity purchased and sold through a tie line; $P_{grid,t}$ represents an amount of electricity purchased and sold through the tie line, a positive value of $P_{grid,t}$ indicating that the grid purchases electricity through the tie line in the time period t, and a negative value of $P_{grid,t}$ indicating that the grid sells electricity through the tie line in the time period t; c wt represents a cost of the wind curtailment per unit electricity; $c^{pv}$ represents a cost of the PV curtailment per unit electricity; $c^{load}$ represents a cost of the load curtailment per unit electricity; $P_{PV,t}^{\alpha}$ represents an available output of the wind turbine generator set in the time period t; $P_{PV,t}^{\alpha}$ represents an available output of the photovoltaic generator set in the time period t; $P_{load,t}^{cur}$ represents the load curtailment in the time period t; and $\Delta t$ represents a duration of the time period t.

In order to ensure the reliable operation of the grid, the following constraints are imposed on the variables in the objective function:

$$\begin{cases} P_{DG,t} + P_{WT,t} + P_{PV,t} + P_{HS,t}^{c} + P_{HS,t}^{d} + P_{grid,t} = D_t \\ P_{DG}^{min} \leq P_{DG,t} \leq P_{DG}^{max} \\ P_{DG}^{down} \leq P_{DG,t} - P_{DG,t-1} \leq P_{DG}^{up} \\ P_{grid}^{min} \leq P_{grid,t} \leq P_{grid}^{max} \\ 0 \leq P_{WT,t} \leq P_{WT,t}^{\alpha} \\ 0 \leq P_{PV,t} \leq P_{PV,t}^{\alpha} \\ HS_t = HS_{t-1} + \left( \eta^c P_{HS,t}^{c} - \frac{P_{HS,t}^{d}}{\eta^d} \right) \Delta t \\ HS^{min} \leq HS_t \leq HS^{max} \\ 0 \leq P_{load,t}^{cur} \leq D_t \end{cases}$$

Where, t=1, 2, ..., T; $D_t$ represents a user load in the time period t; $P_{DG}^{min}$ and $P_{DG}^{max}$ respectively represent an upper limit and a lower limit of an active power output of the diesel generator set; $P_{DG}^{down}$ and $P_{DG}^{up}$ respectively represent a maximum ramping down rate and a maximum ramping up rate of the active power output of the diesel generator set in the time period t; $P_{grid}^{min}$ and $P_{grid}^{max}$ respectively represent upper limits of electricity sold and purchased through the submarine cable; $HS_t$ represents a hydrogen storage amount in a hydrogen storage tank in the hydrogen energy storage system in the time period t; $HS_{t-1}$ represents a hydrogen storage amount in a time period t−1; $\eta^c$ represents a hydrogen production efficiency; $\eta^d$ represents a discharging efficiency of a hydrogen fuel cell; and, $HS^{min}$ and $HS^{max}$ respectively represent an upper limit and a lower limit of the hydrogen storage amount in the hydrogen storage tank in the hydrogen energy storage system.

On the basis of the deterministic objective function, uncertainties of the wind power generation output, the photovoltaic output, and the load are considered, to construct a nondeterministic source-grid-load-storage coordination dispatching model, namely an expectation of the objective function, which is expressed by a symbol E of an expectation function:

$$\min E \left\{ \sum_{t=1}^{T} (C_{f,t} + C_{m,t} + C_{p,t} + C_{cur,t}) \right\}$$

For subsequent approximate calculation of the expected value, in an embodiment, the solving problem of the dispatching model of source-grid-load-storage coordination optimization is converted to a multi-stage dynamic programming based on the approximate dynamic programming technique in the reinforcement learning theory. A pre-state variable $S_{k,t}$ before a decision and a state variable $S_{k,t}^{x}$ after the decision are introduced, specifically including:

The objective function is divided as:

$$\min \{ C_t(S_{k,t}, x_{k,t}) + \gamma E[V_{t+1}(S_{k,t+1})|(S_{k,t}, x_{k,t})] \}$$

Where, $x_{k,t}$ is a decision variable at a kth iteration, including the active power of the diesel generator set, the active power generation of the wind turbine generator set, the active power generation of the photovoltaic generator set, the charging and discharging powers of the hydrogen energy storage system, and the load curtailment, namely $x_{k,t}$ E $\{P_{DG,t}, P_{WT,t}, P_{PV,t}, P_{HS,t}^{c}, P_{HS,t}^{d}, P_{load,t}^{cur}\}$; $S_{k,t}$ is the pre-state variable before executing the decision variable, including the available output of the photovoltaic generator set, the available output of the wind turbine generator set, the hydrogen storage amount, a limit value of the user load, the price of electricity purchased and sold through the tie line in the time period t, and the active power of the diesel generator set in the time period t−1, namely $S_{k,t} \in \{P_{WT,t}^{\alpha}, P_{PV,t}^{\alpha}, HS_t, D_t, p_t, P_{DG,t-1}\}$;

$C_t(S_{k,t}, x_{k,t})$ is a determined factor, representing a grid operating cost before executing the decision variable in a case of the pre-state variable $S_{k,t}$ in the time period t at the kth iteration. $E[V_{t+1}(S_{k,t+1})|(S_{k,t}, x_{k,t})]$ is an expectation factor, representing an expectation of $V_{t+1}(S_{k,t+1})$ in a case of the pre-state variable S k, t and the decision variable $x_{k,t}$. $V_{t+1}(S_{k,t+1})$ represents a value function of $S_{k,t+1}$. A value function is defined as a future expected payoff attained by executing a corresponding a certain decision, when started from a specified state S and triggering from the present step. Thus, $V_{t+1}(S_{k,t+1})$ in this embodiment means the grid operating cost obtained by executing different decision variables in a case of the pre-state variable $S_{k,t+1}$ from a time period t+1. γ represents a preset discount factor ranged between 0 and 1, representing a degree of concern about an expected future cost. γ being 0 means that only a cost of a current stage is concerned about, and γ being 1 means that expected costs of all future stages are concerned about.

The decision variable $x_{k,t}$ is executed in the time period t, to generate the approximate value function $\overline{V}_t^x(S_{k,t}^x)$ of the state variable $S_{k,t}^x$ after the execution. Then, the approximate value function $\overline{V}_t^x(S_{k,t}^x)$ is used to replace the expectation factor of the objective function, to obtain the source-network-load-storage coordination dispatching model as:

$$V_t(S_{k,t}) = \min\{C_t(S_{k,t}, x_{k,t}) + \gamma \overline{V}_t^x(S_{k,t}^x)\}$$

As such, the problem is converted to solve the value function $\overline{V}_t^x(S_{k,t}^x)$ after the decision, which formally eliminates the calculation of the expected value.

In an embodiment, $\overline{V}_t^x(S_{k,t}^x)$ is solved by iterative updating, during which an observation cost function is needed. In an embodiment, an observation cost is defined as a sum of a real-time cost of the grid and the approximate value function of a previous iteration. The observation cost function at the kth iteration is specifically expressed as:

$$F_{k,S}(S_{k,t}, x_{k,t}) = C_t(S_{k,t}, x_{k,t}) + \overline{V}_t^x(S_{k-1,t}^x)$$

Where, $C_t(S_{k,t}, x_{k,t})$ represents a grid operating cost before executing the decision variable in a case of the pre-state variable $S_{k,t}$ in the time period t at the kth iteration; and $\overline{V}_t^x(S_{k-1,t}^x)$ represents the approximate value function of the state variable $S_{k-1,t}^x$ after executing the decision variable $x_{k-1,t}$ in the time period t at the (k−1)th iteration.

In this embodiment, at the beginning of the iterative process, namely when k=0, an initial value of the approximate value function $\overline{V}_t^x(S_{k,t}^x)$ is set to 0. Based on the observation cost function, the approximation value function $\overline{V}_t^x(S_{k,t}^x)$ at the kth iteration is iteratively updated as:

$$\overline{V}_t^x(S_{k,t}^x) = (1-\alpha)\overline{V}_{k-1,t-1}^x(S_{k-1,t-1}^x) + \alpha F_{k,S}(S_{k,t}, x_{k,t})$$

Where, α is a preset smooth step, which is used for controlling an iterative updating rate of an algorithm, $\alpha \in [0,1]$; and $\overline{V}_{k-1,t-1}^x(S_{k-1,t-1}^x)$ represents the approximate value function of the state variable $S_{k-1,t-1}^x$ after executing the decision variable in the time period t−1 at the (k−1)th iteration.

In this embodiment, before starting the iterative process, the forecast data of the output of a set for generating electricity from renewable energy sources and the user load needs to be obtained, in order to set initial values that are easier to converge for the state variable and the decision variable before the iteration, thereby speeding up the convergence speed. Historical data of the output of a set for generating electricity from renewable energy sources and the user load are respectively obtained; nonlinear fitting is performed on the historical data; and the forecast data of the output of a set for generating electricity from renewable energy sources and the user load in the dispatching cycle is obtained according to a fitting result. In an embodiment, the nonlinear fitting is implemented based on a conventional MATLAB fitting function, which is not detailed herein.

The iterative process starts after inputting the obtained forecast data into the dispatching model. In each iteration, the updated approximation value function is substituted into the dispatching model, and the overall dispatching model is solved, to obtain the decision variable $x_t$ when $V_t(S_{k,t})$ reaches a minimum value under a premise of satisfying a constraint. In a case that a difference between two adjacent solving results is less than a preset threshold, the iterative process is terminated. It may be regarded that when the solving result satisfies a preset convergence condition, the iterative process is terminated, that is, the solving result is converged. The iteratively solved decision variable $x_t$ constitutes the dispatching strategy, so that dispatchers may, with reference to the decision variable $x_t$, adjust the active power of the diesel generator set, the active power generation of the wind turbine generator set, the active power generation of the photovoltaic generator set, and the charging and discharging powers of the hydrogen energy storage system, and the load curtailment.

The sequence numbers in the foregoing embodiments are merely for description, and do not indicate an order in which the components are assembled or used.

The above descriptions are merely embodiments of the present disclosure, and are not intended to limit the present disclosure. Any modification, equivalent replacement, improvement, etc. made within the spirit and principle of the present disclosure shall all be included within the protection scope of the present disclosure.

The invention claimed is:

1. A source-network-load-storage coordination dispatching method in a background of a coupling of renewable energy sources, comprising:
    taking an expectation of a minimum grid operating cost in a dispatching cycle as an objective function;
    generating an approximate value function of an output of a set for generating electricity from renewable energy sources and a user load, and constructing a source-network-load-storage coordination dispatching model with combination of the objective function;
    obtaining forecast data of the output of a set for generating electricity from renewable energy sources and the user load, and inputting the forecast data into the dispatching model for solving;
    performing iterative updating on the approximate value function, importing the approximate value function after the iterative updating into the dispatching model for iterative solving, and terminating an iterative process until a solving result satisfies a preset convergence condition; and
    using a solving result of a last iteration as a dispatching strategy of the output of a set for generating electricity from renewable energy sources and the user load.

2. The source-network-load-storage coordination dispatching method according to claim 1, wherein the set for generating electricity from renewable energy sources comprises a wind generator set, a photovoltaic generator set, and a hydrogen energy storage system, and the taking an expectation of a minimum grid operating cost in a dispatching cycle as an objective function comprises:
    dividing the dispatching cycle into T time periods, and constructing a grid operating cost function as:

$$\min \sum_{t=1}^{T}(C_{f,t} + C_{m,t} + C_{p,t} + C_{cur,t})$$

$$C_{f,t} = k_{DG} \cdot P_{DG,t} \cdot \Delta t$$

$$C_{m,t} = \left[l_{DG} \cdot P_{DG,t} + l_{WT} \cdot P_{WT,t} + l_{PV} \cdot P_{PV,t} + l_{HS} \cdot \left(P_{HS,t}^c + P_{HS,t}^d\right)\right] \cdot \Delta t$$

$$C_{p,t} = p_t \cdot P_{grid,t} \cdot \Delta t$$

$$C_{cur,t} = \left[c^{wt} \cdot \left(P_{WT,t}^a - P_{WT,t}\right) + c^{pv} \cdot \left(P_{PV,t}^a - P_{PV,t}\right) + c^{load} \cdot P_{load,t}^{cur}\right] \cdot \Delta t$$

wherein, $C_{f,t}$ represents a fuel cost of a diesel generator set in a time period t; $C_{m,t}$ represents an operation and maintenance cost of the diesel generator set, a wind generator set, a photovoltaic generator set, and a hydrogen energy storage system in the time period t; $C_{p,t}$ represents a cost of purchasing and selling electricity through a submarine cable in the time period t; $C_{cur,t}$ represents a cost of a wind curtailment, a photovoltaic (PV) curtailment, and a load curtailment in the time period t; $k_{DG}$ represents a fuel cost of the diesel generator set per unit active power generation; $P_{DG,t}$ represents an active power of the diesel generator set in the time period t; $I_{DG}$ represents an operation and maintenance cost of the diesel generator set; $I_{WT}$ represents an operation and maintenance cost of the wind turbine generator set per unit active power generation; $I_{PV}$ represents an operation and maintenance cost of the photovoltaic generator set per unit active power generation; $I_{HS}$ represents an operation and maintenance cost of the hydrogen energy storage system per unit active power generation; $P_{WT,t}$ represents an active power generation of the wind turbine generator set in the time period t according to the dispatching strategy; $P_{PV,t}$ represents an active power generation of the photovoltaic generator set in the time period t according to the dispatching strategy; $P_{HS,t}^c$ represents a charging power of the hydrogen energy storage system in the time period t according to the dispatching strategy; $P_{HS,t}^d$ represents a discharging power of the hydrogen energy storage system in the time period t according to the dispatching strategy; $p_t$ represents a price of electricity purchased and sold through a tie line; $P_{grid,t}$ represents an amount of electricity purchased and sold through the tie line; $c^{wt}$ represents a cost of the wind curtailment per unit electricity; $c^{pv}$ represents a cost of the PV curtailment per unit electricity; $c^{load}$ represents a cost of the load curtailment per unit electricity; $P_{WT,t}^\alpha$ represents an available output of the wind turbine generator set in the time period t; $P_{PV,t}^\alpha$ represents an available output of the photovoltaic generator set in the time period t; $P_{load,t}^{cur}$ represents the load curtailment in the time period t; $\Delta t$ represents a duration of the time period t; and constraints imposed on the grid operating cost function comprises:

$$\begin{cases} P_{DG,t} + P_{WT,t} + P_{PV,t} + P_{HS,t}^c + P_{HS,t}^d + P_{grid,t} = D_t \\ HS_t = HS_{t-1} + \left(\eta^c P_{HS,t}^c - \frac{P_{HS,t}^d}{\eta^d}\right)\Delta t \\ 0 \le P_{load,t}^{cur} \le D_t \end{cases}$$

wherein, $HS_t$ represents a hydrogen storage amount in the time period t; $HS_{t-1}$ represents a hydrogen storage amount in a time period t−1; $\eta^c$ represents a hydrogen production efficiency; $\eta^d$ represents a discharging efficiency of a hydrogen fuel cell; and $D_t$ represents the user load in the time period t; and taking an expectation of the grid operating cost function in the dispatching cycle as the objective function.

3. The source-network-load-storage coordination dispatching method according to claim 2, wherein in a case that $P_{grid,t}$ has a positive value, it indicates that a grid purchases electricity through the tie line in the time period t; and in a case that $P_{grid,t}$ has a negative value, it indicates that the grid sells electricity through the tie line in the time period t.

4. The source-network-load-storage coordination dispatching method according to claim 1, wherein the generating an approximate value function of an output of a set for generating electricity from renewable energy sources and a user load, and constructing a source-network-load-storage coordination dispatching model with combination of the objective function comprises:

dividing the objective function as:

$$\min\{C_t(S_{k,t},x_{k,t}) + \gamma E[V_{t+1}(S_{k,t+1})|(S_{k,t},x_{k,t})]\}$$

wherein, $x_{k,t}$ is a decision variable at a kth iteration, comprising an active power of a diesel generator set, an active power generation of a wind turbine generator set, an active power generation of a photovoltaic generator set, charging and discharging powers of a hydrogen energy storage system, and a load curtailment; $S_{k,t}$ is a pre-state variable before executing the decision variable at the kth iteration, comprising an available output of the photovoltaic generator set, an available output of the wind turbine generator set, a hydrogen storage amount, a limit value of the user load, a price of electricity purchased and sold through a tie line in the time period t, and an active power of the diesel generator set in a time period t−1; $C_t(S_{k,t}, x_{k,t})$ is a determined factor, representing a grid operating cost before executing the decision variable in a case of the pre-state variable $S_{k,t}$ in the time period t at the kth iteration; $E[V_{t+1}(S_{k,t+1})|(S_{k,t}, x_{k,t})]$ is an expectation factor, representing an expectation of $V_{t+1}(S_{k,t+1})$ in a case of the pre-state variable $S_{k,t}$ and the decision variable $x_{k,t}$; $V_{t+1}(S_{k,t+1})$ represents a value function of $S_{k,t+1}$, representing the grid operating cost obtained by executing different decision variables in a case of the pre-state variable $S_{k,t+1}$ from a time period t+1; and $\gamma$ represents a preset discount factor; and executing the decision variable $x_{k,t}$ in the time period t, to generate the approximate value function $\overline{V}_t^x(S_{k,t}^x)$ of the state variable $S_{k,t}^x$ after the execution, and replacing the expectation factor of the objective function with the approximate value function $\overline{V}_t^x(S_{k,t}^x)$, to obtain the dispatching model as:

$$\min\{C_t(S_{k,t},x_{k,t}) + \gamma \overline{V}_t^x(S_{k,t}^x)\}.$$

5. The source-network-load-storage coordination dispatching method according to claim 4, wherein the terminating an iterative process until a solving result satisfies a preset convergence condition comprises:

terminating the iterative process in a case that a difference between two adjacent solving results is less than a preset threshold, the solving results comprising the decision variable and the state variable at the last iteration.

6. The source-network-load-storage coordination dispatching method according to claim 1, wherein the performing iterative updating on the approximate value function, importing the approximate value function after the iterative updating into the dispatching model for iterative solving comprises:

adding a real-time grid cost and the approximate value function of a previous iteration as an observation cost, the observation cost at a kth iteration being expressed as:

$$F_{k,S}(S_{k,t},x_{k,t}) = C_t(S_{k,t},x_{k,t}) + \overline{V}_t^x(S_{k-1,t}^x)$$

wherein, $C_t(S_{k,t}, x_{k,t})$ represents a grid operating cost before executing a decision variable in a case of a pre-state variable $S_{k,t}$ in a time period t at the kth iteration; and $\overline{V}_t^x(S_{k-1,t}^x)$ represents the approximate value function of a state variable $S_{k-1,t}^x$ after executing a decision variable $x_{k-1,t}$ in the time period t at a (k−1)th iteration;

performing the iterative updating on the approximation value function $\overline{V}_t^x(S_{k,t}^x)$ at the kth iteration as:

$$\overline{V}_t^x(S_{k,t}^x) = (1-\alpha)V_{k-1,t-1}^x(S_{k-1,t-1}^x) + \alpha F_{k,S}(S_{k,t}, x_{k,t})$$

wherein, $\alpha$ is a preset smooth step, $\alpha \in [0,1]$; and $\nabla_t^x(S_{k,t}^x)$ represents the approximate value function of the state variable $S_{k-1,t-1}^x$ after executing the decision variable in a time period t−1 at the (k−1)th iteration; and substituting $\overline{V}_t^x(S_{k,t}^x)$ into the dispatching model, and solving the decision variable $x_{k,t}$ in the dispatching model.

7. The source-network-load-storage coordination dispatching method according to claim 1, wherein an initial value of the approximate value function is 0.

8. The source-network-load-storage coordination dispatching method according to claim 1, wherein the obtaining forecast data of the output of a set for generating electricity from renewable energy sources and the user load comprises:

obtaining historical data of the output of a set for generating electricity from renewable energy sources and the user load respectively, performing nonlinear fitting on the historical data to obtain a fitting result, and obtaining the forecast data of the output of a set for generating electricity from renewable energy sources and the user load in the dispatching cycle according to the fitting result.

* * * * *